United States Patent [19]
Stewart et al.

[11] Patent Number: 5,654,731
[45] Date of Patent: Aug. 5, 1997

[54] SHIELDED PIXEL STRUCTURE FOR LIQUID CRYSTAL DISPLAYS

[75] Inventors: Roger Green Stewart, Neshanic Station, N.J.; Bruno Mourey, Voiron, France

[73] Assignee: Thomson Consumer Electronics, S.A., Courbevoie, France

[21] Appl. No.: 739,236

[22] Filed: Oct. 29, 1996

Related U.S. Application Data

[63] Continuation of Ser. No. 242,396, May 13, 1994.

[51] Int. Cl.$^6$ ........................................................ G09G 3/36
[52] U.S. Cl. ........................................................ 349/42
[58] Field of Search ............................... 345/94; 359/59

[56] References Cited

U.S. PATENT DOCUMENTS

| | | | |
|---|---|---|---|
| 4,513,397 | 4/1985 | Ipri et al. | 365/185 |
| 5,105,288 | 4/1992 | Senda et al. | 345/94 |
| 5,146,356 | 9/1992 | Carlson | 359/59 |
| 5,185,601 | 2/1993 | Takeda et al. | 359/59 |
| 5,379,050 | 1/1995 | Annis et al. | 345/94 |
| 5,432,625 | 7/1995 | Morin et al. | 359/59 |
| 5,438,241 | 8/1995 | Zavracky et al. | |

FOREIGN PATENT DOCUMENTS

| | | |
|---|---|---|
| 0294899 | 12/1988 | European Pat. Off. |
| 4-358127 | 12/1992 | Japan. |

*Primary Examiner*—Richard Hjerpe
*Assistant Examiner*—Juliana S. Kim
*Attorney, Agent, or Firm*—Joseph S. Tripoli; Joseph J. Laks; Sammy S. Henig

[57] ABSTRACT

A liquid crystal display device includes first and second transparent substrates spaced from one another and having facing surfaces with a liquid crystal material between the facing surfaces. A transparent electrode overlays the facing surface of one substrate. The facing surface of the other substrate supports: (a) a matrix of pixel electrodes (b) a plurality of data lines extending in a first direction, (c) a plurality of select lines extending in a second direction and crossing the data lines at crossover points, (d) a plurality of solid state switching devices for electrically connecting the data lines to the pixel electrodes. The pixel electrodes lay in a first plane while the data lines and the select lines lay in at least one other plane spaced from the first plane. A conductive transparent shield extends between the first plane and the other plane.

8 Claims, 4 Drawing Sheets

SHIELDED PIXEL STRUCTURE FOR LIQUID CRYSTAL DISPLAYS

This is a continuation of Ser. No. 242,396, filed May 13, 1994.

This invention relates generally to liquid crystal displays (LCD) and particularly to a shielded pixel structure for such displays.

BACKGROUND

In an attempt to improve the resolution of LCD displays and to reduce the fabrication cost there is an effort underway to reduce the size of the pixels in active matrix liquid crystal display devices (AMLCD). This is particularly true of projection LCD's. These efforts have not been as successful as desired because of problems with aperture ratio and edge effects.

The pixel electrodes of LCD's are made of transparent conductive material, such as idium tin oxide (ITO), poly-silicon or αSi. In addition to the pixel electrodes an LCD includes select lines, data lines, and solid state switching devices, which are used to connect the data lines to the pixel electrodes. An LCD also includes a black matrix to improve display brightness by preventing light from exiting between the pixles. The data lines, select lines, TFT's and black matrix are opaque. Aperture ratio is defined as the transparent area of the panel divided by the total area of the panel. This ratio becomes a problem as the pixel electrodes are made smaller because the opaque elements of the display remain approximately the same size. In high density displays such as projection displays, the opaque elements of the display may occupy up to 70% of total area leaving only 30% transparent. Hence, 70% of the light is lost and a lower quality granular image results. A structure which increases the percentage of light transparent area would constitute a marked advance in the art.

Small pixels are also more susceptible to edge effects caused by a non-planar surface and infringing electric fields. These edge effects degrade the contrast ratio and can lead to non-uniformities in the display.

SUMMARY

A liquid crystal display device includes substantially parallel spaced transparent substrates and a liquid crystal material between facing surfaces of the substrates. A transparent electrode overlays the facing surface of one substrate. The facing surface of the other substrate supports (a) a matrix of pixel electrodes, (b) a plurality of data lines extending in one direction, (c) a plurality of select lines extending in another direction and crossing the data lines at crossovers and (d) a plurality of solid state switching devices for electrically connecting the data lines to the pixel electrodes. The pixel electrodes lay in a first plane while the data and select lines lay in at least one other plane. A conductive transparent shield extends between the first plane and the other plane.

DETAILED DESCRIPTION

Figure 1:
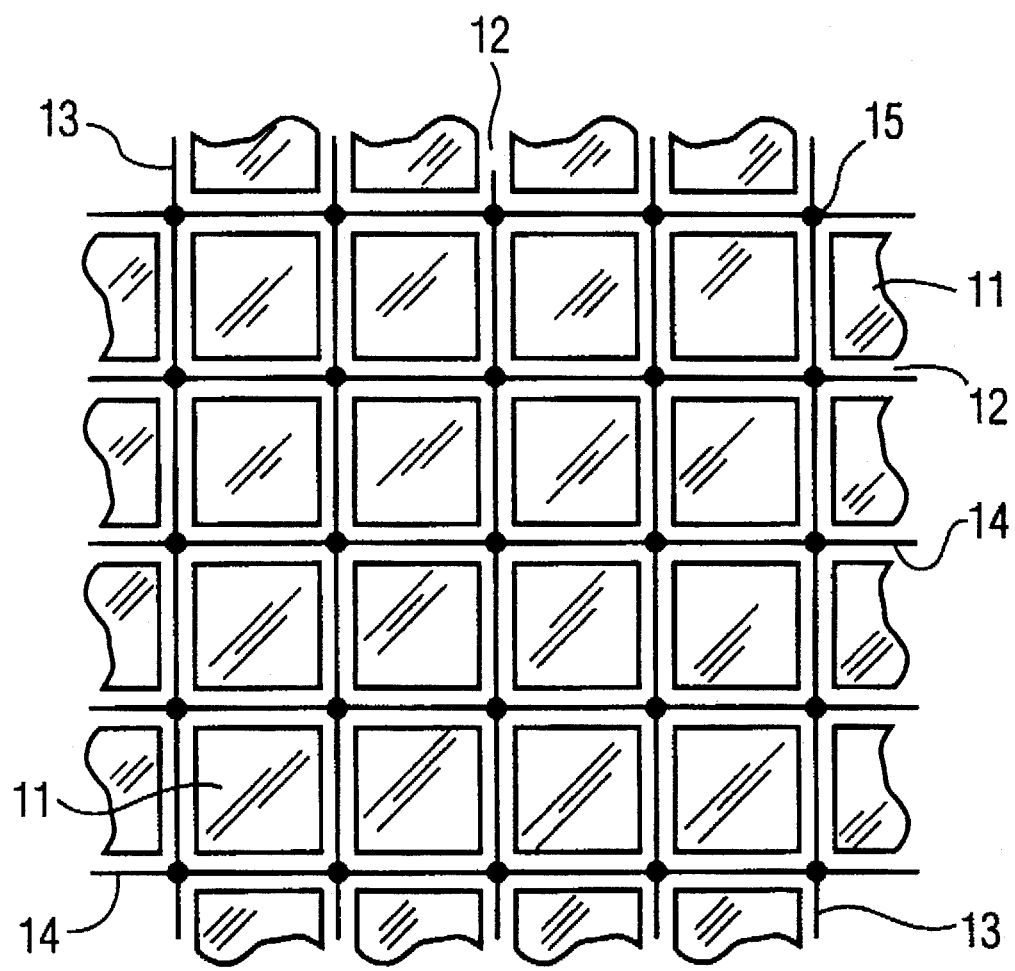
FIG. 1 shows a portion of a prior art liquid crystal display device.

FIG. 1 shows a portion of a prior art liquid crystal display device including a matrix of pixel electrodes 11 separated by spaces 12 in both directions. Data lines 13 are arranged in the spaces extending in one direction while select lines 14 are arranged in the spaces extending in the orthogonal direction. The data and select lines are parallel to the respective sides of the pixel electrodes. The data lines 13 and select lines 14 cross at crossovers and are insulated from one another. Solid state switching devices 15, such as thin film transistors (TFT's), are arranged at each crossover of a data line and a select line. The switching devices are used, in known manner, to connect the data lines to the pixel electrodes to cause the desired image to be displayed across the viewing area of the display device in response to voltages on the select lines.

Figure 2:
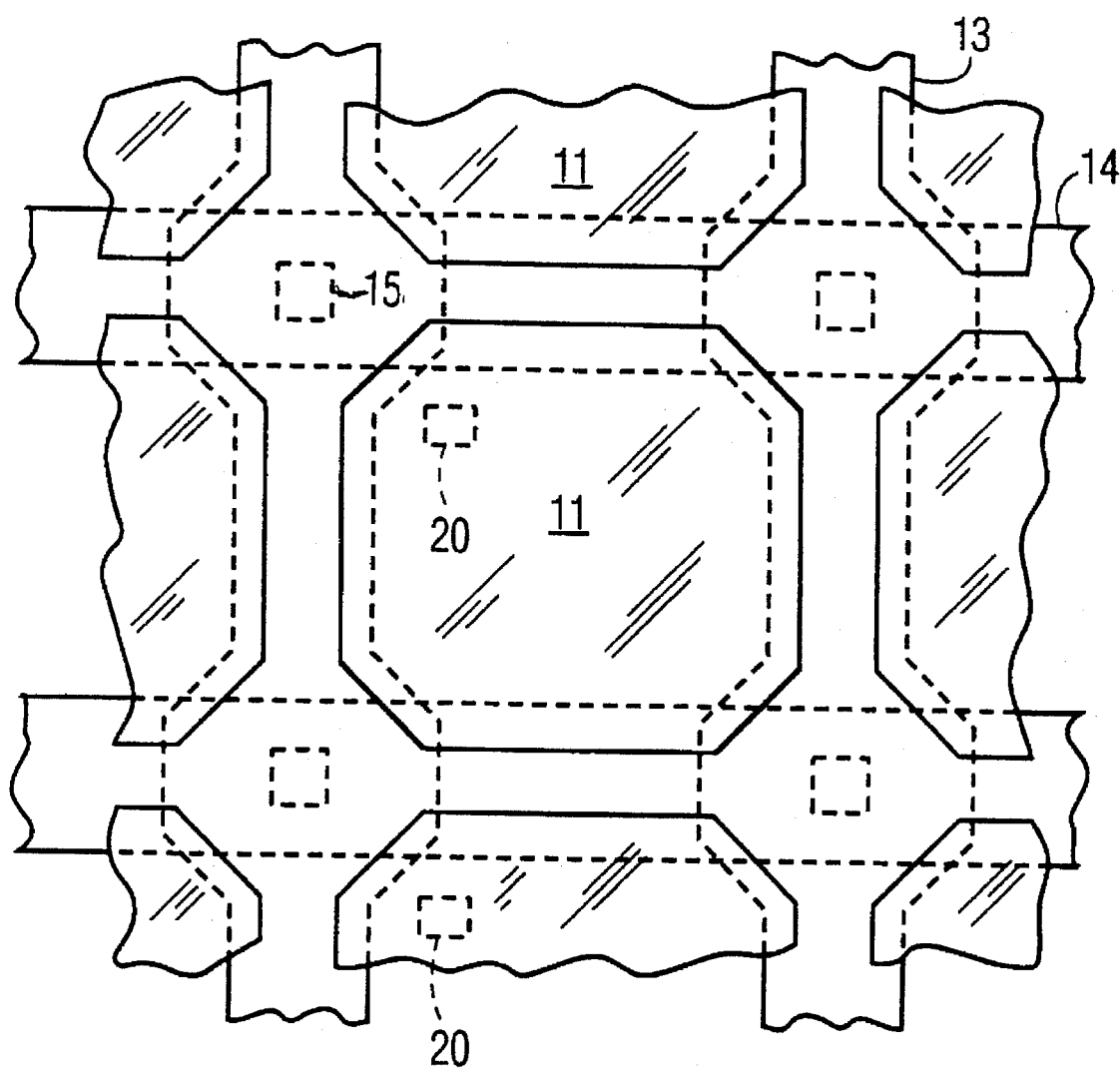
FIG. 2 is a top view of a preferred embodiment with the top substrate and liquid crystal material removed to show the overlap of the pixel electrodes with the data lines and the select lines.

FIG. 2 is a top view with all elements above the pixel electrodes removed to show that the pixel electrodes 11 overlap, but are electrically insulated from, the data lines and the select lines. The data and select lines are insulated from one another at the crossovers. The TFT's 15 preferably are arranged in the proximity of the crossovers. The overlap eliminates the need for the black matrix and thus improves the aperture ratio because light can not exit between the pixel electrodes due to the overlap.

Figure 3:
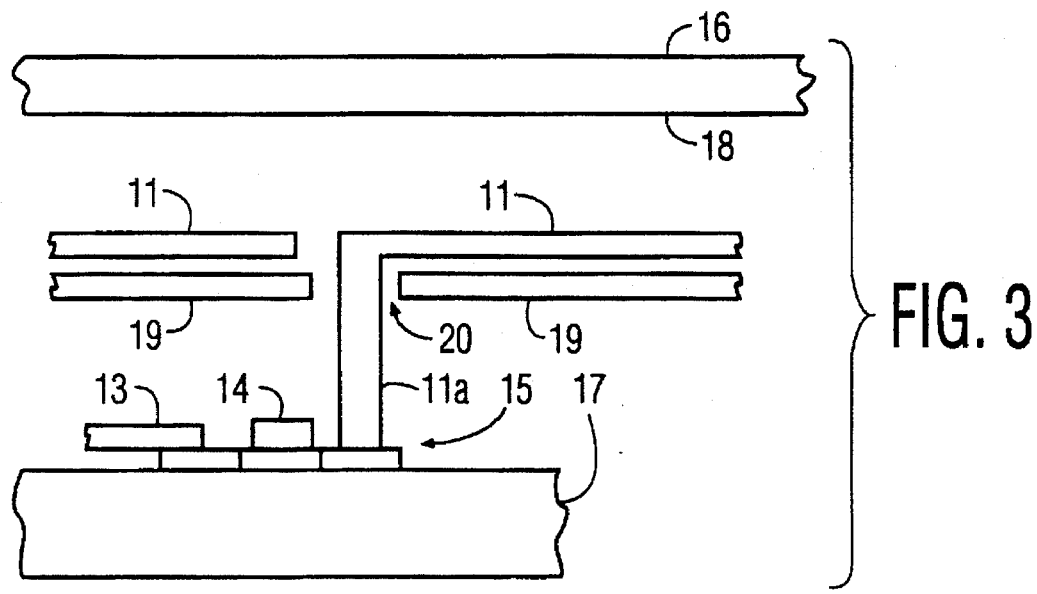
FIG. 3 is a pictorial of the invention to show how the various elements cooperate.

FIG. 3 pictorially shows the arrangement of the elements of one pixel. Two transparent substrates 16 and 17 are held in a rigid, spaced relationship whereby the substrates have respective substantially parallel facing surfaces. The facing surface of substrate 16 supports a transparent electrode 18. The facing surface of substrate 17 supports the data lines 13, select lines 14, and the TFT 15. The pixel electrodes 11 are supported in a plane which is spaced from the planes of the data and select lines. A transparent conductive shield 19 is arranged between the plane of the pixel electrodes 11 and those of the data lines 13 and select lines 14. Apertures 20 are arranged within shield 19 at locations which permit the pixel electrodes 11 to be electrically connected to the drains of TFTs 15 by connectors 11a. The pixel electrodes 18 are planarized and are shielded from the lateral electric fields extending out from the data and select lines. The shield 19 can be set to a reference potential (ground) and its presence dramatically increases the capacitance at each pixel site. The actual structure of a preferred embodiment of a pixel is shown in FIG. 4.

Figure 4:
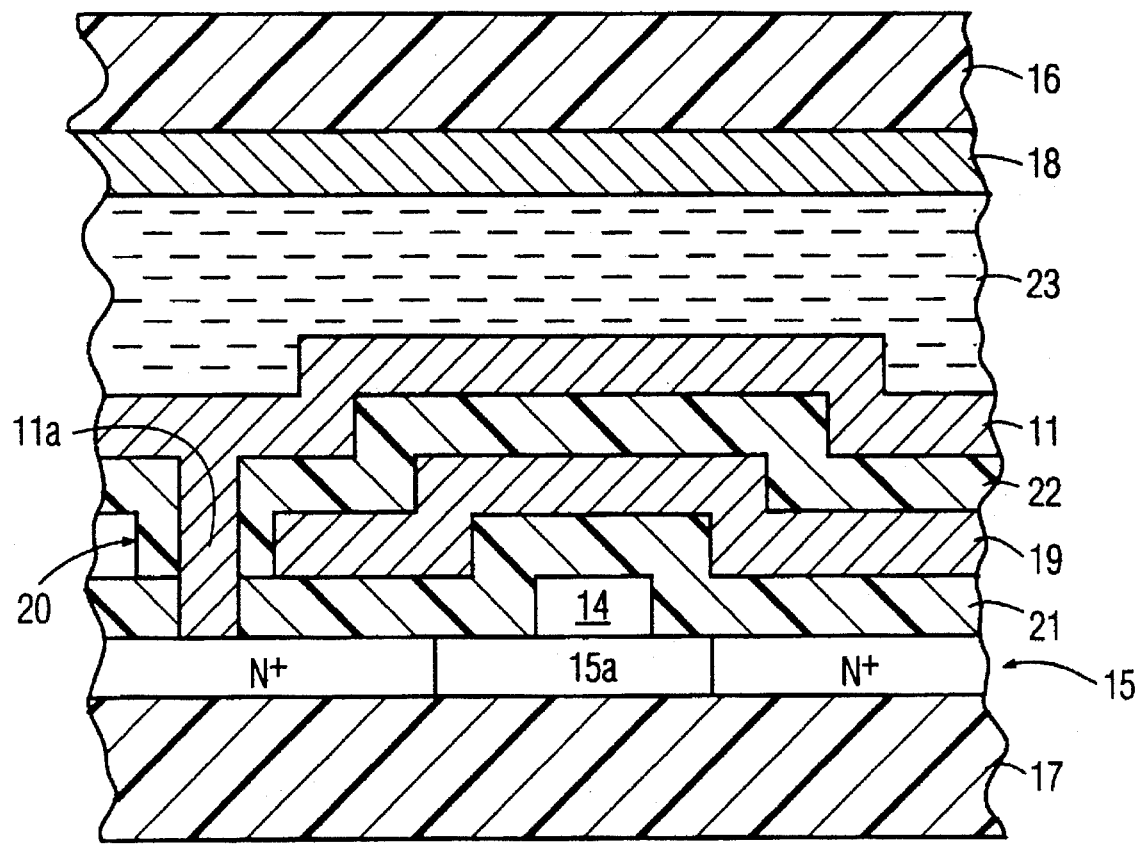
FIG. 4 is a cross section of a preferred embodiment.

FIG. 4 is a cross section of a preferred embodiment of a pixel incorporating the invention. Substrate 17 supports the TFT 15 having two positively doped sections indicated by N+ with a channel section 15a (conduction path) there between. A select line 14 is deposited in known manner and is covered with an insulative layer 21. The transparent conductive shield 19 is deposited over the insulative layer 21. Apertures 20 are formed in the shield 19 at various locations, shown in FIG. 2, through which the connectors 11a are formed to connect the pixel electrodes 11 to the drains of the TFT's 15. Another insulative layer 22 is deposited over the shield 19. The insulating material also fills the apertures 20. After the insulative layer 22 is applied, a hole, having a diameter smaller than the aperture 20 within the shield 19, is made (preferably by etching) through both insulative layers 21 and 22 as well as the insulation which flowed into aperture 20 during the deposition of insulative layer 22. Pixel electrode 11 is deposited onto the insulative layer 22 and the conductive material is deposited in the aperture through the insulative layers to form the connector 11a and connect the pixel electrode 11 to the drain of the TFT 15. The substrates 16 and 17 are joined in known manner such that the transparent conductive electrode 18 on the facing surface of substrate 16 faces pixel electrode 11. A liquid crystal material of known type is inserted into the space formed between the electrodes 11 and 18.

When adjacent pixel electrodes 11 are at the same potential, i.e., storing the same information, undesirable edge effects can be minimized by optimizing the structure. This voltage condition does not exist in all instances and the edge effects increase as the difference between voltages on adjacent electrodes increases.

Figure 5:
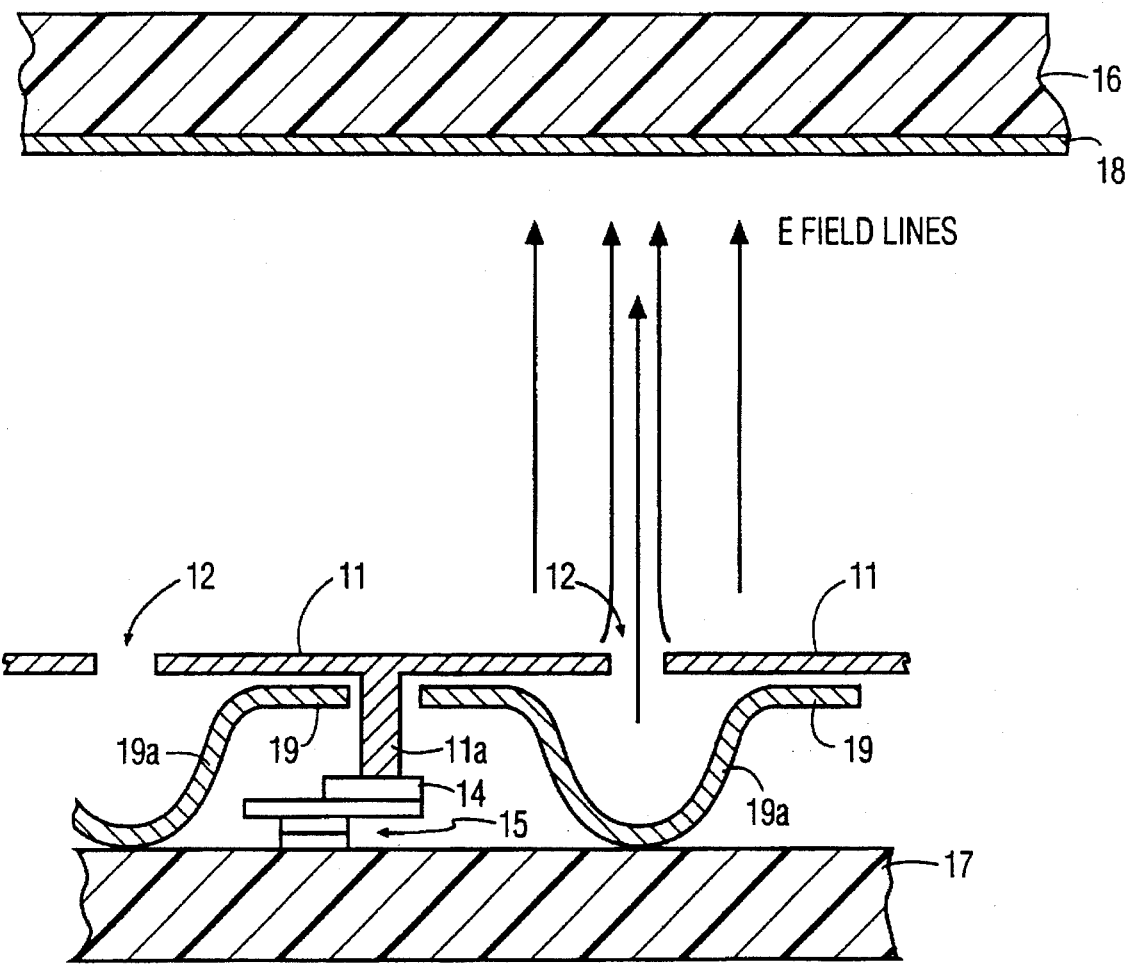
FIG. 5 is a preferred embodiment having recessions to improve pixel fringe effects.

FIG. 5 shows an embodiment in which edge effects are minimized by recessing a portion 19a of a shield 19 away from the gap 12 between adjacent pixel electrodes 11. In this manner the lateral field coupling adjacent pixel electrodes and mechanical coupling through the liquid crystal material is sufficient to control the alignment of the liquid crystal material even in the gap region between pixel electrodes. Consequently, the aperture ratio is now limited only by the thickness of the select lines, data lines and transistor area so that the aperture ratio can approach 100%. This embodiment can be fabricated by placing recesses in the substrate 17 prior to applying any of the various layers which form the pixel. In addition to the shield 19, the insulative layers may also contain the recesses 19a. Electrically this is of no consequence. The pixel electrode 11 is made planar by filling the recesses 19a when the insulative layer 22 is applied.

We claim:

1. A liquid crystal display device comprising:
   first and second substrates arranged in a substantially parallel spaced relationship whereby said substrates have facing surfaces and at least one of said substrates is transparent;
   a liquid crystal material between said facing surfaces;
   an electrode overlaying said facing surface of said first substrate;
   said facing surface of said second substrate supporting: (a) a matrix of pixel electrodes (b) a plurality of data lines extending in a first direction, (c) a plurality of select lines extending in a second direction and crossing said data lines at crossover points, and (d) a plurality of solid state switching devices for electrically coupling said data lines to said pixel electrodes, said pixel electrodes overlapping at least portions of said switching devices, at least portions of said data lines and at least portions of said select lines; and
   a conductive shield extending between said pixel electrodes and said plurality of solid state switching devices, said at least portions of said data lines and said at least portions of said select lines, said shield being spaced from said pixel electrodes in a manner to increase substantially pixel electrode capacitances.

2. The device of claim 1 wherein said shield contains apertures through which said pixel electrodes are coupled to said switching devices.

3. The device of claim 2 wherein said shield is held at a reference potential.

4. A liquid crystal display device comprising:
   first and second substrates arranged in a substantially parallel spaced relationship whereby said substrates have facing surfaces and at least one of said substrates is transparent;
   a liquid crystal material between said facing surfaces;
   an electrode overlaying said facing surface of said first substrate;
   said facing surface of said second substrate supporting: (a) a matrix of pixel electrodes (b) plurality of data lines extending in a first direction, (c) a plurality of select lines extending in a second direction and crossing said data lines at crossover points, and (d) a plurality of solid state switching devices for electrically coupling said data line to said pixel electrodes, said pixel electrodes overlapping at least portions of said data lines and at least portions of said select lines; and
   a conductive shield extending between said pixel electrodes and said at least portions of said data lines and said at least portions of said select lines, said shield being spaced from said pixel electrodes in a manner to increase substantially pixel electrode capacitances wherein said shield includes recessed portions extending away from said pixel electrodes in the proximity of gaps separating said pixel electrodes.

5. The device of claim 1 wherein said shield contains apertures through which said pixel electrodes are coupled to said switching devices.

6. The device of claim 5 wherein said shield is held at a reference potential.

7. A liquid crystal display device comprising:
   first and second substrates arranged in a substantially parallel spaced relationship wherein said substrates have facing surfaces and at least one of said substrates is transparent;
   a liquid crystal material between said facing surfaces;
   an electrode overlaying said facing surface of said first substrate;
   said facing surface of said second substrate supporting: (a) a matrix of pixel electrodes (b) a plurality of data lines extending in a first direction, (c) a plurality of select lines extending in a second direction and crossing said data lines at crossover points, and (d) a plurality of solid state switching devices for electrically coupling said data lines to said pixel electrodes, said pixel electrodes lying in a first plane, and said data lines and said select lines lying in at least one other plane spaced from said first plane; and
   a conductive shield extending between said first plane and said at least one other plane and overlapping adjacent ones of said pixel electrodes, said shield including recessed portions, that extend away from said pixel electrodes, in the proximity of gaps separating said pixel electrodes.

8. A liquid crystal display device comprising:
   first and second substrates arranged in a substantially parallel spaced relationship whereby said substrates have facing surfaces and at least one of said substrates is transparent;
   a liquid crystal material between said facing surfaces;
   an electrode overlaying said facing surface of said first substrate;
   said facing surface of said second substrate supporting: (a) a matrix of pixel electrodes (b) a plurality of data lines extending in a first direction, (c) a plurality of select lines extending in a second direction and crossing said data lines at crossover points, and (d) a plurality of solid state switching devices for electrically coupling said data lines to said pixel electrodes, said pixel electrodes overlapping at least portions of said data lines and at least portions of said select lines; and a conductive shield extending between said pixel electrodes and said at least portions of said data lines and said at least portions of said select lines, said shield being spaced from said pixel electrodes in a manner to increase substantially pixel electrode capacitances, said shield containing apertures through which said pixel electrodes are connected to said switching devices.

* * * * *